INVENTOR.
BERTHOLD A. KNAUTH
BY Roger L. Martin
ATTORNEY

Jan. 27, 1970     B. A. KNAUTH     3,491,594

FLUID FLOW METERING DEVICE

Filed Dec. 13, 1966     6 Sheets-Sheet 3

INVENTOR.
BERTHOLD A. KNAUTH
BY
ATTORNEY

Jan. 27, 1970   B. A. KNAUTH   3,491,594
FLUID FLOW METERING DEVICE
Filed Dec. 13, 1966   6 Sheets-Sheet 4
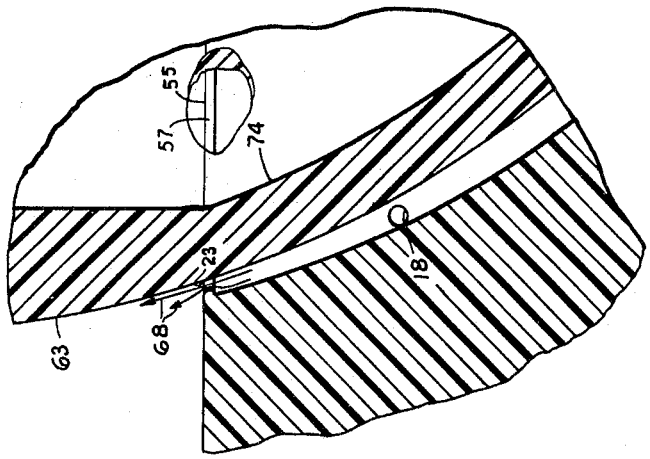
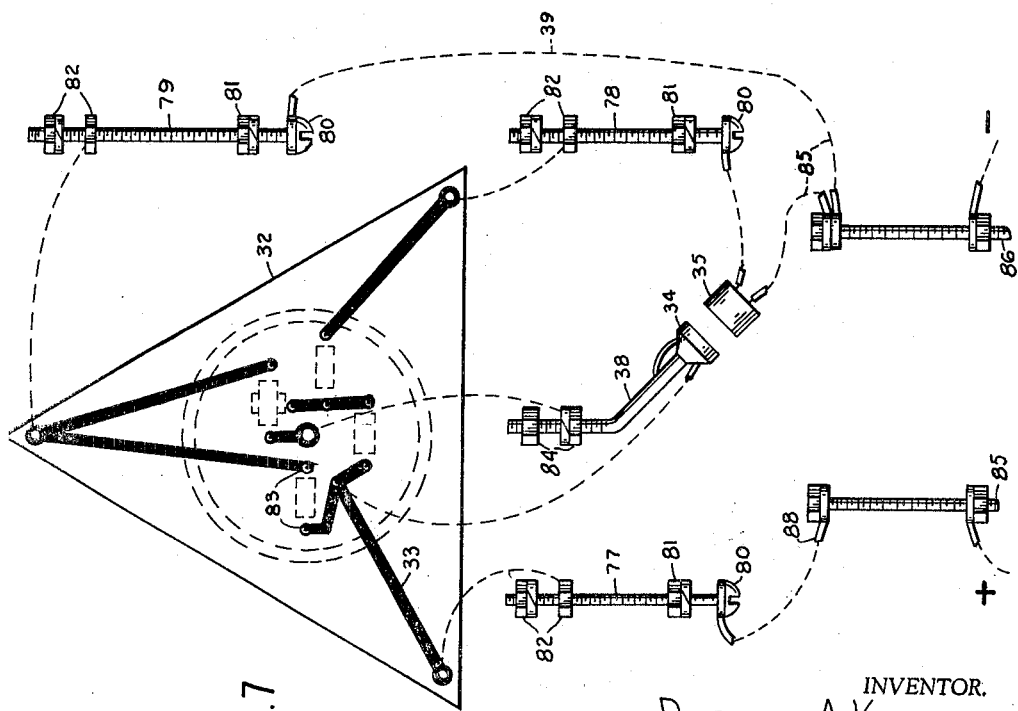
INVENTOR.
BERTHOLD A. KNAUTH
BY
ATTORNEY

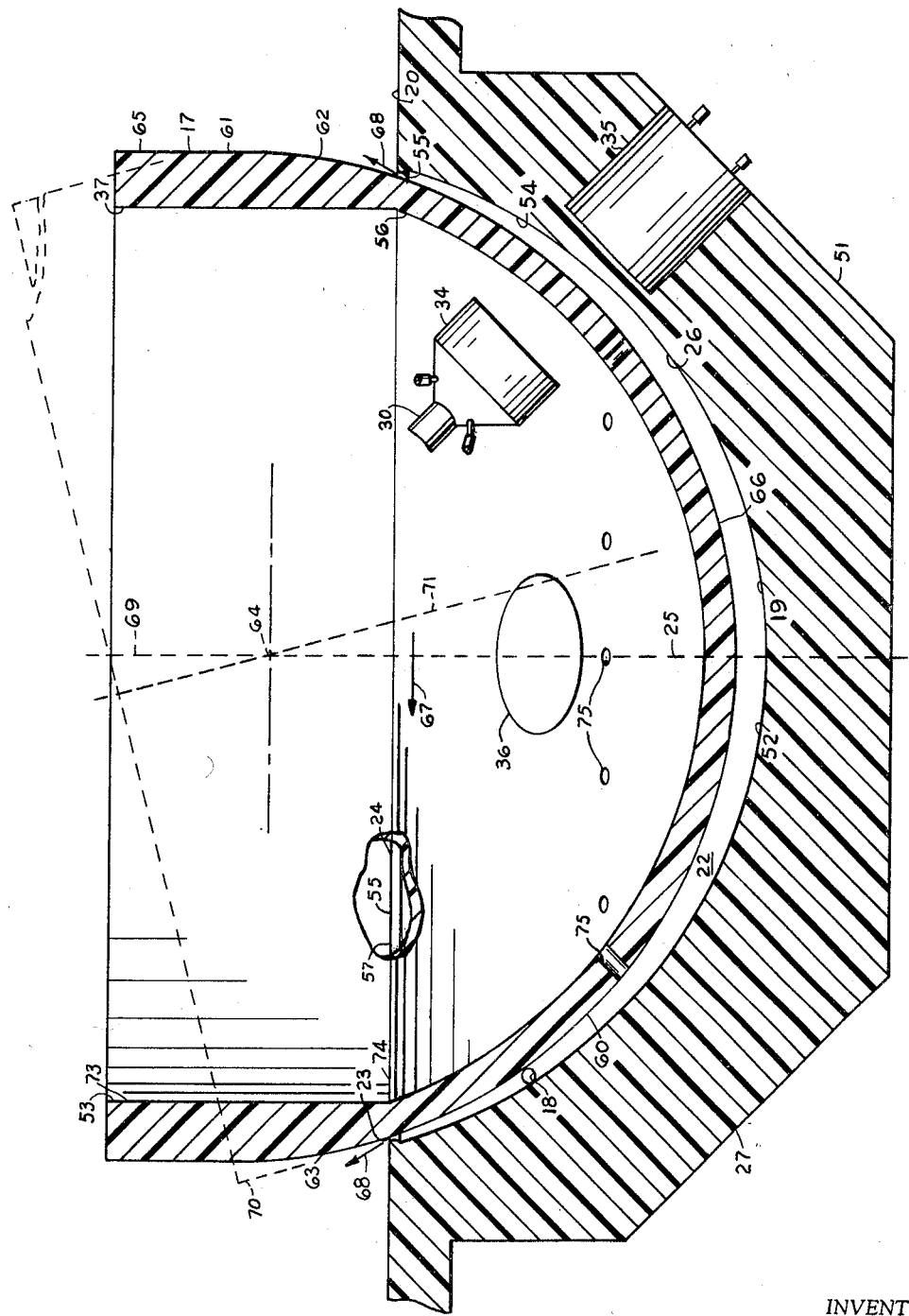

Jan. 27, 1970  B. A. KNAUTH  3,491,594
FLUID FLOW METERING DEVICE
Filed Dec. 13, 1966  6 Sheets-Sheet 6

INVENTOR.
BERTHOLD A. KNAUTH
BY
Roger L. Martin
ATTORNEY

United States Patent Office 3,491,594
Patented Jan. 27, 1970

3,491,594
FLUID FLOW METERING DEVICE
Berthold Antonio Knauth, Daytona Beach, Fla., assignor to Rotron Manufacturing Company, Inc., Woodstock, N.Y., a corporation of New York
Filed Dec. 13, 1966, Ser. No. 601,426
Int. Cl. G01f 1/00
U.S. Cl. 73—230
15 Claims

ABSTRACT OF THE DISCLOSURE

A fluid flow metering device has a hollow rotor which is driven and wholly supported on a revolving body of fluid that is maintained in a zone of a cavity in which the rotor is oriented. The fluid body rotates about the axis of the cavity and a flow constricting lip at the mouth of the cavity cooperates with a centrifugally acting annular portion of the rotor in maintaining the rotor axis in alignment with the cavity axis so that rotation of the rotor can be sensed by fixed elements of a system for translating the rotary motion into electrical pulses. Passageways in the rotor and which communicate with the zone improve linearity and the device is shown in a shunt circuit for sensing differential pressure across an orifice in a natural gas conduit.

This invention relates to fluid flow metering devices, and more particularly to the kind that have a fluid driven rotor which responds to changes in the flow rate of the fluid delivered to the device with an appropriate change in its angular velocity.

A general object of the invention is to provide improvements in fluid flow metering devices.

Fluid flow metering devices that utilize a fluid driven rotor are well known and are used, among other things, for measuring the volume flow rate of fluids in pipes or conduits. They are also used in control systems wherein equipment regulation depends on the flow rate of fluid in a conduit, or upon a factor depending on, or determining such flow rate. Such devices are also useful components for other measuring devices which, in the formulation of the measurement, require knowledge of the fluid flow rate or a rate determining or depending factor, such as the differential pressure.

In principle, the angular velocity of the rotor in such devices bears a linear relation to the velocity of the fluid delivered to the device, and hence by suitable translation of the rotary movement, an indication of the fluid velocity can be obtained and used for measurement or regulatory purposes. For example with an indication, of the fluid velocity, the volume flow rate can be computed from known constants involved in the system, as is known by those skilled in the art. In most cases, these computations are automatically performed and continuously recorded on suitable charts or the like, and/or are totalized to provide integrated total flow information.

In practice, various factors adversely influence the linear relationship. Mechanical friction between moving parts, for example, varies with the relative movement of the parts, and in many instances, this severely limits the range of accurate usage of such metering devices without recalibration. In other instances the rotors are bulky and relatively slow to respond to changes in the flow rate.

Much has been accomplished in the past toward the reduction of mechanical friction. The more modern flow meters for instance avoid the use of direct mechanical linkages with the rotors in order to translate the motion into useful intelligence and instead use remote motion detecting systems that provide a suitable electrical output which is indicative of the motion. In addition much has been done to improve the mechanical supports for the rotors so as to minimize the amount of friction that is encountered as the rotor revolves. These improved rotor supports, however, are expensive to manufacture, and although reducing the amount of friction encountered, are nevertheless subject to mechanical wear and costly maintenance.

One object of the invention is to provide a rotor and fluid drive arrangement in a device of the kind contemplated and wherein the rotor is supported by fluid when it is being driven.

Another object is to provide a metering device of improved accuracy.

Another object is of the invention to provide improvements that minimize the amount of mechanical wear encountered and which accordingly serve to reduce maintenance costs.

Yet another object is to provide improvements that are directed to eliminating mechanical friction as a factor influencing rotor movement and the resultant accuracy of the device.

A still further object of the invention is to provide improvements that enable manufacturers of flow metering devices to avoid using expensive and precision built mechanical rotor support systems.

Another objective of the invention is to provide a low cost, and quick responding fluid flow meter that can be used over wide ranges of fluid flow rates with accurate results and which, for all practical purposes, is free of maintenance occasioned by the frictional wear of mechanical components.

In accord with the invention an arrangement is provided in a metering device in which the rotor is wholly supported by fluid when it is being driven and is driven through contact with a rotating fluid body that rotatably responds to changes in the flow rate of the fluid delivered to the device. Certain aspects of the invention relate to providing a fluid supported rotor which is self orienting and stabilized to rotate with respect to the axis of the rotating body and a predetermined axis of the rotor so as to facilitate suitable detection of the rotary movement of the rotor.

The principles of the invention may be embodied in either liquid or gas metering devices. One particular field of application is in the metering of gas flow in natural gas conduits that are located in remote areas, and hence the preferred embodiment will be described with this usage in mind without intending, however, to so limit usage of the invention concepts.

The novel features which are believed to be characteristic of this invention are set forth with particularity in the appended claims. The invention, itself however, both as to its organization and method of operation, together with further objects and advantages thereof, may best be understood by reference to the following description taken in connection with the accompanying drawings, in which:

Figure 1:
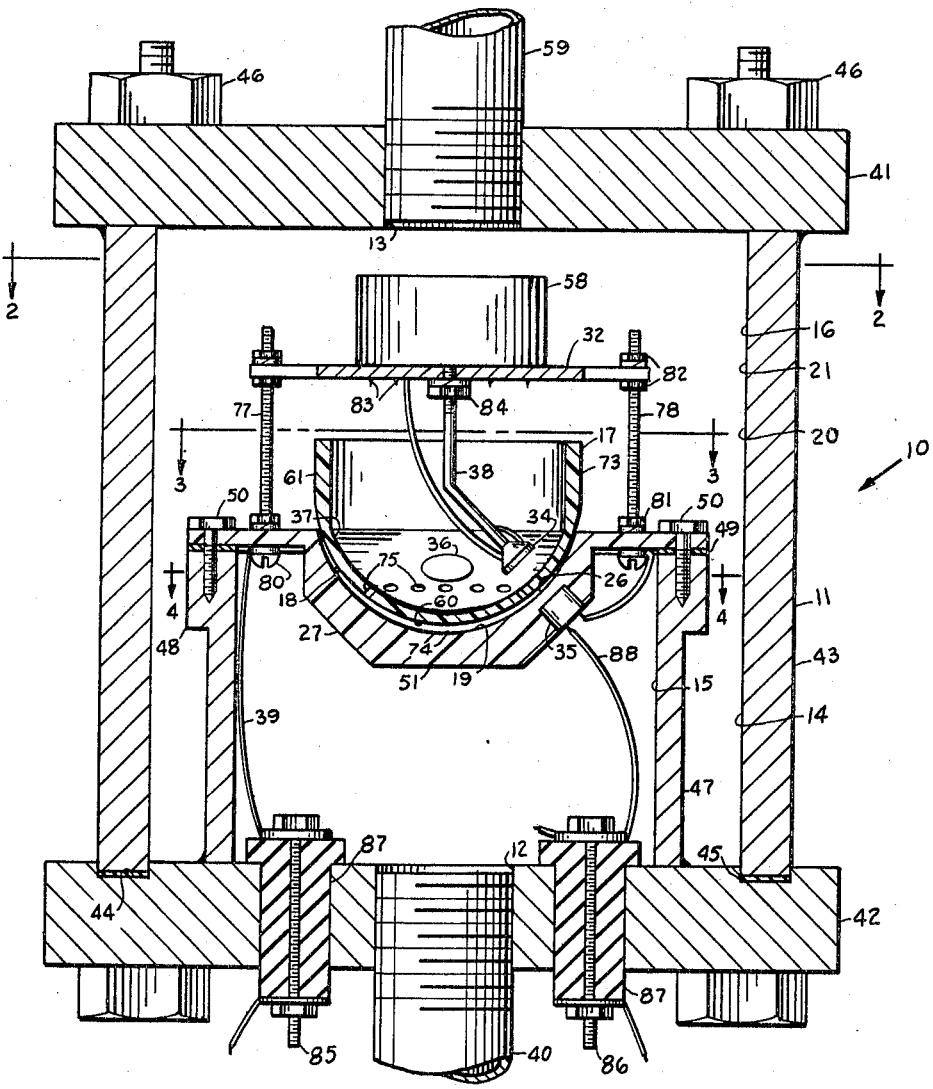
FIG. 1 is a vertical view taken in section along the axis of a gas flow metering device embodying the invention.
Figure 2:
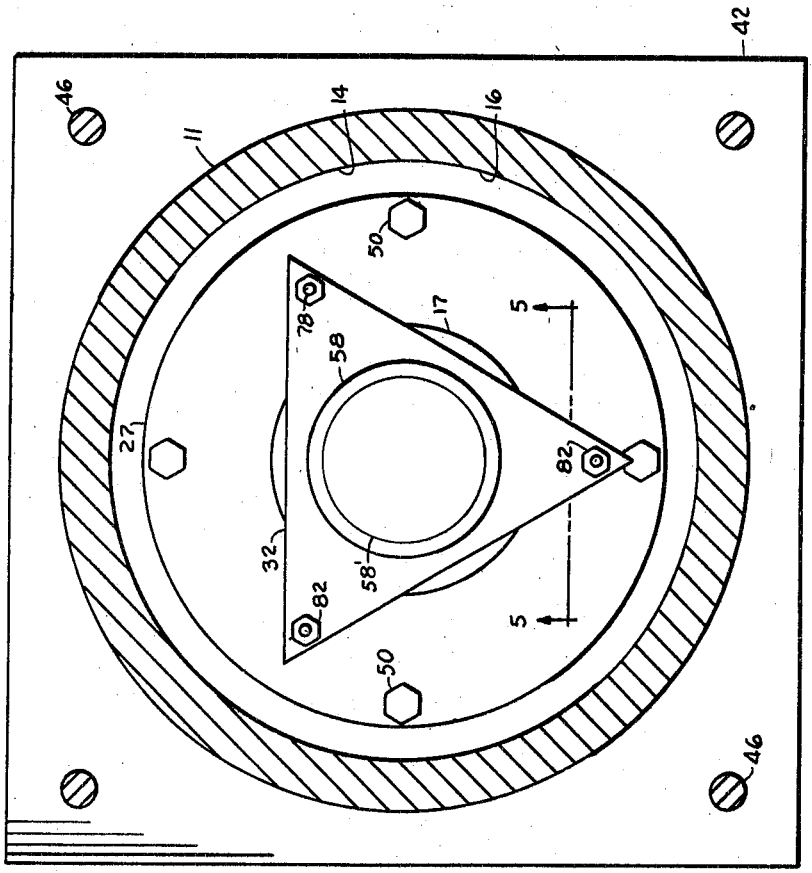
FIG. 2 is a horizontal section view through the device, as generally seen along the lines 2—2 of FIG. 1.
Figure 3:
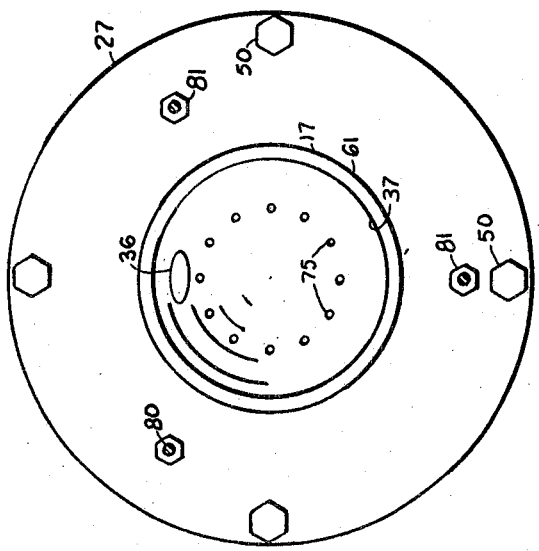
FIG. 3 is a horizontal plan view of the rotor component and an orifice plate component of the device, as these components are generally seen along the lines 3—3 of FIG. 1 with certain components involved in detecting the rotor movement being removed.
Figure 5:
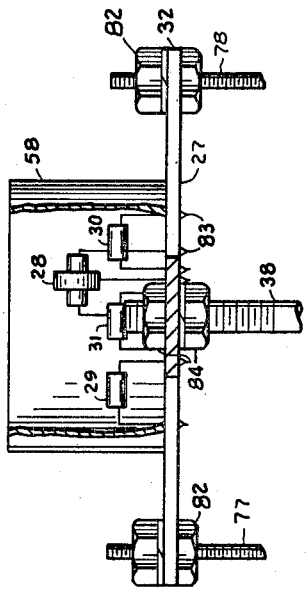
Figure 6:
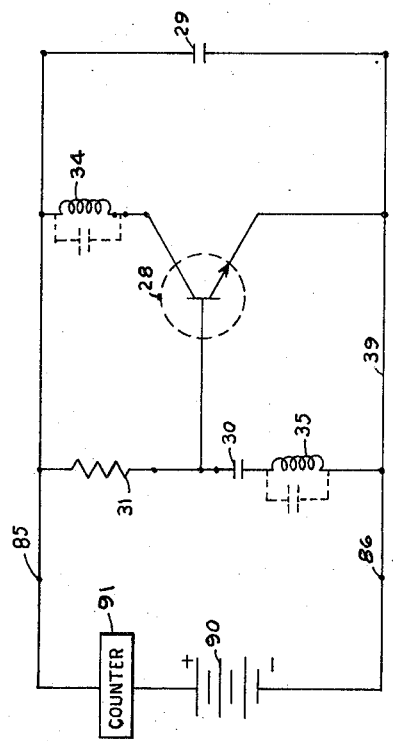
Figure 10:
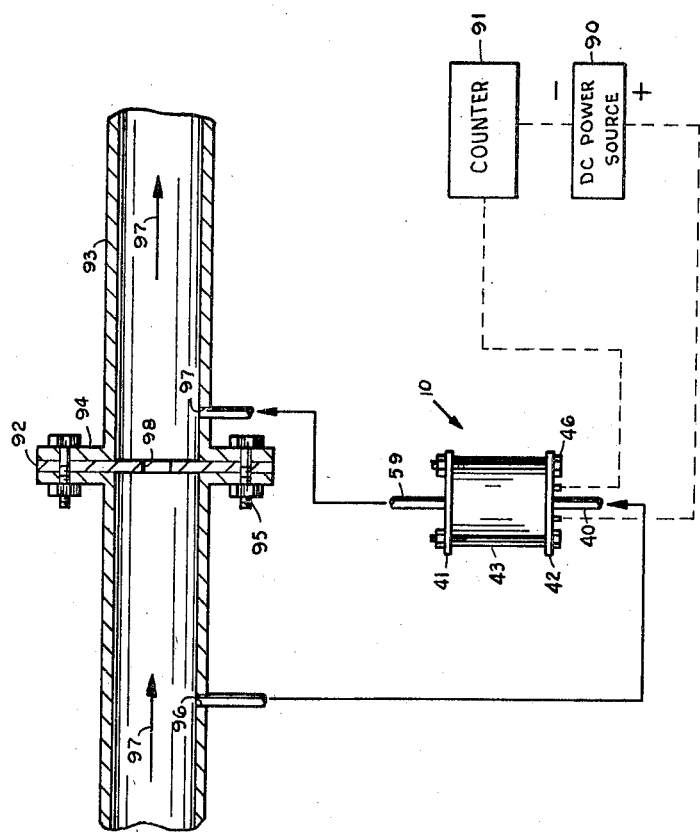

FIG. 5 is an enlarged view of a supporting plate and housing for certain components of a circuit used in translating the rotor motion into an electrical output signal together with adjacent structure, the support plate being partly in section as seen along the lines 5—5 of FIG. 2, whereas certain parts of the housing are broken away and other parts removed to expose the internally housed components of the circuit;

FIG. 6 is a circuit diagram showing the translation circuit with a counter connected in the output of the circuit;

FIG. 7 shows the bottom side of the supporting plate seen in FIG. 1 and illustrates certain circuit elements printed on the plate, and also diagramatically illustrates how the supports for the plate generally function as elements of the electrical conduits shown in FIG. 6;

FIG. 8 is an enlarged vertical section view along the axis of the rotor and the rotor plate, and illustrates these components when the rotor is being driven and supported on the fluid body;

FIG. 9 is a further enlargement of a fragment of the rotor and orifice plate seen in FIG. 8 and serves to better illustrate the arrangement at the mouth of a cavity in the orifice plate under the conditions depicted in FIG. 8; and FIG. 10 schematically illustrates a typical natural gas line installation for the flow metering device and shows the device in use as a proportional gas flow meter that is hooked in a circuit which shunts a portion of the gas flow in a main around a differential pressure producer.

Reference is now made to the drawings and wherein a gas flow metering device embodying the invention is generally designated at 10. The metering device 10 has a housing 11 which is provided with an inlet port 12 and on outlet port 13 so as to enable the gas delivered to the device to pass through the housing when the meter is in use. The interior 14 of the housing is divided into two chambers, designated at 15 and 16. The rotor 17 is housed in chamber 16, and chamber 15 receives the fluid delivered to the device through port 12. This chamber 15 serves as a plenum chamber and distributes the gas to a pair of orifices 18 that serve as fluid inlets for the rotor chamber.

The arrangement in chamber 16 is such as to provide two fluid zones, 19 and 20, in the interior 21 of chamber 16, and the rotor is supported when the device is oriented as seen in the drawings on a body 22 of fluid that is established in zone 19 when the gas is initially fed to the metering device. The fluid in this body 22 is maintained by the gas discharging from the orifices 18 into chamber 16, and the gas continuously escapes from zone 19 into zone 20 through an annular opening 23 that is created as the rotor is lifted from its seat during the establishment of the fluid body 22. The arrangement in the chamber adjacent to the rotor 17 is such that the fluid body rotates about the axis 25 of a cavity 26 which is formed in the wall of the chamber. This cavity 26 is located in an orifice plate component 27 of the metering device, and the fluid supported rotor 17, through contact with the body fluid in the cavity 26, is rotatably driven by the fluid with respect to the same axis. Orifices 18 and port 13 permit the fluid delivered to the device to pass through chamber 16 and hence into driving contact with the rotor 17 in zone 19. The fluid discharges from chamber 16 through the discharge port 13 which connects with zone 20 and here passes to the exterior of the device.

Rotary movement of rotor 17 is detected and translated into an electrical output signal which is related to the angular velocity of the rotor by a circuit arrangement designated at 39. This circuit 39 includes a transistor 28, two capacitors 29 and 30 and a resistor 31, all of which are mounted on a triangular plate 32 that is supported above the rotor 17 in chamber 16. Plate 32 has certain elements 33 of the circuit 39 which are printed on the bottom, as seen in FIG. 7, and the mentioned circuit components are housed in a hollow cylindrical shell 58 which is supported on this plate 32. Shell 58 is filled with a suitable plastic material shown in the drawings at 58'. This plastic material serves to shield and electrically insulate the components from direct contact with the fluid in the chamber 16. Circuit 39 also includes two coils, designated at 34 and 35, and which are inductively arranged and used to detect the rotational movement of the rotor by sensing a metal segment 36 which is fixed to the rotor 17 and located in the hollow 37 thereof. Each time the rotor makes a complete revolution, the segment 36 passes between the spaced coils 34 and 35 and interrupts the inductive relation of the coils and in this way the rotary movement of the rotor is detected in the particular circuit illustrated. Coil 34 is mounted at the end of a metal probe 38 which is suspended from plate 27 and which projects into the hollow of the rotor. The other coil 35 is mounted in a recess in the orifice plate and which is located at the supply chamber side of the plate.

Housing 11 includes two rectangular metal plates, 41 and 42, which are spaced apart by a hollow cylindrical metal shell component 43 of the housing. The upper end of shell 43 is welded to the underside of plate 41 whereas the bottom end of the shell 43 fits in an annular recess 44 in the upper surface of plate 42. An annular seal 45 in the recess 44 provides a fluid type joint, and the components of the housing 11 are clamped together by four bolt type fasteners designated at 46 and which are located exteriorly of the shell. Plate 41 has an opening that serves as the outlet port 13 for the device, and a discharge conduit 59 is shown threaded in the opening for receiving the fluid discharge from chamber 16. The bottom plate 42, on the other hand, has a central opening that serves as the inlet port 12 for the device and here the fluid is delivered to the device through a conduit 40 which is threaded in the plate opening as shown in the drawings.

The supply chamber 15 is formed in part by a hollow cylindrical shell 47 which is arranged in the interior of the housing 11 and welded upright on plate 42 in coaxial arrangement with the outer shell 43. The upper end of shell 47 has a laterally extending flange 48, and the orifice plate 27 rests on the flange through an intervening annular fluid tight seal 49 whereat it is fastened to the flange by screw type fasteners, designated at 50.

The orifice plate 27 forms the top wall of the plenum chamber 15 and also serves as a wall component for the rotor chamber 16. The central portion 51 of the plate 27 is recessed, as seen in FIGS. 1 and 8, so as to facilitate an upwardly opening arrangement of the cavity 26 at the down stream side of the plate. The recessed plate arrangement also facilitates a horizontal arrangement for the orifices 18 in the plate.

The cavity 26 is defined by a surface 52 and the rim portion 55 of the surface 52 projects inwardly at the mouth of the cavity and overhangs the cavity space therebelow to provide an annular lip 24 at the opening in the cavity 26. The rim 55 defines the mouth or cavity opening 57 and below the rim 55, the major portion 54 of surface 52 has a contour which generally matches that of a spherical segment in the illustrated embodiment. The lip 24 serves as the seat for the rotor and supports the rotor spacedly apart from the wall of the cavity below the rim when the rotor is at rest.

The rotor 17, as best seen in FIG. 8 is generally arranged in the cavity opening 57 and has a base section 60 which is generally disposed in the cavity 26 below the opening 57. It also has an annular section 61 which extends above the base and the opening 57 in the cavity as seen in the drawing. The hollow portion 37 of the rotor is defined by the cylindrical interior surface portion 53 of section 61 and the inner surface 56 of the base 60. These sections 60 and 61 are formed integral in the manufacture of the rotor, and the rotor is preferably made from a suitable light weight material so as to minimize the effects of inertia on rotor movement when fluid velocity changes occur and also to minimize the amount of energy expended for the support of the rotor. In the illustrated embodiment a suitable plastic material, such as one of the acrylic resins, is used so as to avoid interference with the inductive relation of coils 34 and 35.

The exterior surface 62 of rotor 17 has a hemispherical bottom surface portion 63 that includes the exterior surface 66 of the base 60. This surface 63 extends into the cavity 26 through the opening 57 and has a center of curvature 64 which is above the rotor base 60. Above this hemispherical portion 63 surface 62 has a cylindrical exterior surface portion 65 that merges with the hemispherical surface portion 63 therebelow.

The major portion 54 of the cavity surface 52 generally matches the contour of the exterior surface 66 of base 60 in the illustrated embodiment. When the device is not in use, the rotor 17 sets on the annular lip 24 and under such circumstances surfaces 54 and 66 are spaced apart and define the zone 19 in which the rotating body is initially established when the fluid is delivered to the device.

The orifices 18 are arranged to cooperate with the cavity surface 52 in providing the rotating body 22 in zone 19 and each inlet opens into the cavity through surface 52 below the rim 55. One or more inlets into the cavity may be used although it is preferable to employ a plurality of orifices in a symmetrical arrangement to provide the fluid inlet means for the chamber 16.

Figure 4:
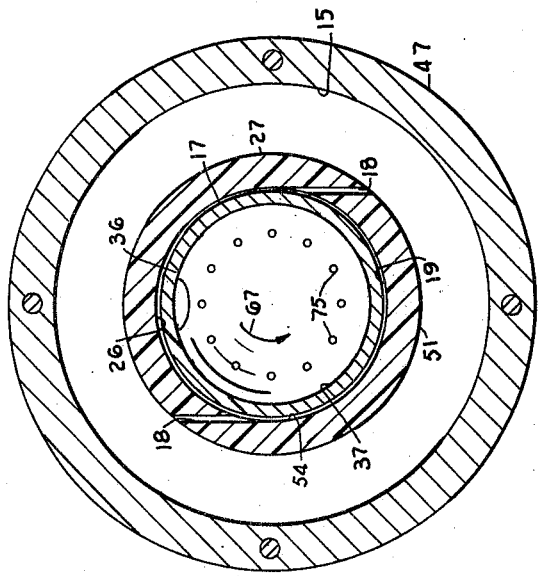
FIG. 4 is a horizontal section view through the rotor and through the orifice plate together with adjacent structure, as these components are generally seen along the lines 4—4 of FIG. 1, the view serving to illustrate the arrangement of certain orifices that provide a means for admitting the fluid to the rotor chamber, with certain parts being removed.

The orifices 18 are symmetrically arranged with respect to the axis 25 of the cavity 26 and each is arranged to discharge the fluid horizontally and in an opposite direction to the other orifice. The arrangement is such that each orifice discharges tangentially to the inside of the circle defined at the intersection of the surface portion 54 with a plane arranged normal to the axis 25 of the cavity and which extends through the other orifice. The orifice arrangement is best shown in FIG. 4. As the fluid discharges from the orifices, the discharge is deflected by the arcuate surface portion 54 angularly toward the rim 55 of the surface 52. This causes the fluid in zone 19 to more or less rotate as a body 22 in the direction of arrow 67 about the cavity axis 25 established by surface 52 and the rotor is accordingly also driven in the same direction.

The rotor 17 is free to rise from its seat and as the fluid body is being established, rotor 17 is buoyed up by the fluid entering the zone 19, and is lifted from its seat at the rim portion 55 of plate 27. As this happens, an annular fluid discharge opening 23 is created between the hemispherical surface 63 of the rotor and the adjacent rim portion 55, and the fluid discharges from zone 19 through this opening 23 and into zone 20 as generally indicated by arrow 68. Thereafter the rotor is supported on the fluid body in zone 19 free from contact with other mechanical components of the device, and of course is rotatably driven through contact with the fluid in the zone in the direction of arrow 67.

It will be noted in FIG. 8 that zone 19 is defined by the cavity surface portion 54 and the surface area of the hemispherical surface 63 confronted thereby. It will also be noted that the fluid body 22 formed in zone 19 by virtue of the arrangement progressively diminishes in thickness laterally of the axis 25 and until the lip at rim portion 55 is encountered at the discharge opening 23 in the zone 19. This lip 24 at rim portion 55 provides a constriction in the path of movement of the fluid through the annular opening 23 as indicated by the arrow 68 in FIG. 9 and for reasons which are unknown at this time, this influence on the fluid movement serves to stabilize the rotor at the center of the cavity opening. Without the flow constricting lip portion 24 experience has shown that the rotor starts to oscillate in the opening 57 and frictionally encounters the walls of the cavity, when the device is subjected to vibrations such as frequently occur at meter installations. It is believed that a localized pressure increase occurs in the body 22 adjacent the rim 55 as the hemispherical surface 63 approaches the rim through movement of the rotor laterally of the cavity axis 25 in the fluid body and that this local increase in pressure tends to force the rotor back toward the center of the opening and thus serves to stabilize the rotor against horizontal movement in the cavity opening.

Various well known translation systems that utilize motion detecting means which are nonmechanically coupled to the rotor may be used in practice. In the illustrated embodiment the rotor is centrifugally stabilized to rotate with respect to its axis 69 and he caviy axis 25 in response to the fluid movement in zone 19 by the annular portion 61, and in this way the segment 36 always traverses a path, when the rotor is being driven, that carries it between the spaced coils 34 and 35.

The axis of rotation of rotor 17 is designated at 69 in FIG. 8, and is shown therein in alignment with axis 25 of the cavity. The wall 73 of the annular portion 61 is generally thicker than the wall 74 of the base 60 and this arrangement serves to concentrate the major portion of the rotor weight in the annular section 61 and provides a center of mass for the rotor which is located at the center of curvature 64 for the hemispherical surface 63. The rotor, of course, is free to tilt with respect to the axis of the cavity and as a result of the arrangement, the center of mass remains on the cavity axis 25 when the rotor tends to tilt, as for example to the tilted position designated at 70 in FIG. 8. In position 70, the rotor axis 69 assumes that indicated at 71 while the fluid in the body nevertheless continues to urge the rotor to rotate about the caviy axis 25. It will be noted that when the rotor is tilted, portions of the annular section 61 have been displaced closer to axis 25, and hence under the influence of the drive arrangement when the rotor is tilted, these portions are urged outwardly by centrifugal force. This causes the rotor to return to an upright position. Because of this, it is apparent that the annular section 61 carries out a stabilizing function and serves to stabilize the rotation of the rotor with respect to axes 25 and 69. Together the annular portion 61 of the rotor 17 and the lip portion 24 of plate 27 cooperate in maintaining the axis 69 of the rotor in alignment with the axis of the revolving body of fluid when the rotor is being driven.

The rotor is arranged for limited movement along the axis of the cavity without encountering the coil 34 on probe 38. Experience indicates that the rotor adjusts itself along the axis 25 in accord with the volume rate of fluid delivered to the device and rises and falls as the rate increases and decreases. It has also been discovered that a pressure differential is created between the zones 19 and 20 when the rotor is supported on the fluid in zone 19, and that the pressure differential is such as to provide a resultant force on the rotor 17 that acts downwardly along axis 25 and hence serves to urge the rotor against the body of fluid in zone 19. This is beneficial for it also aids in preventing the rotor from becoming unseated on the fluid body or dislodged from the cavity when surges occur in the flow rate of fluid delivered to the device or when the flow metering device is subjected to severe vibrations at the point of installation.

It should be evident to those skilled in the art at this point, that the fluid movement in zone 19 is responsive to changes in the differential pressure across the metering device and hence that the apparent angular velocity of the rotating body 22 in zone 19 bears a linear relation to the flow rate of the fluid delivered to the device. As the rotor is lifted from its seat at the rim 55 during establishment of the fluid body 22, the fluid movement in the zone serves to drive the rotor about the cavity axis 25, and because of its freely supported position on the fluid in zone 19, there is an absence of mechanical friction that would otherwise retard or interfere with the rotor movement. As a result rotation of the rotor for all practical purposes is retarded only by friction with the fluid encountering the rotor in zone 20.

In general, it has been found that by thus eliminating all mechanical friction, greater accuracy is realized and over much broader ranges of calibration. In accord with one aspect of the invention, it has been discovered that even greater accuracy may be realized if one or more passageways that communicate with zones 19 and 20 through the base of the rotor 17 are provided. Hence in the preferred embodiment illustrated in the drawings, the rotor 17 is shown as having a plurality of holes 75 in the base section. These holes are symmetrically arranged with respect to the axis 69 of the rotor and are shown as opening into zone 19 and into the hollow below the discharge openings for orifices 18. How these passageways 75 function is unknown at this time but it is believed that the resisance to rotor movement by the fluid in zone 20 is reduced and particularly so in the hollow portion of the rotor.

The triangular support plate 32 in chamber 16 is made from suitable electrical insulation material and is supported spacedly above the rotor 17 on three electrically conductive, threaded metal fasteners indicated at 77, 78 and 79. The heads 80 of these fasteners are located in chamber 15, and each extends upwardly through the orifice plate 27 and is securely fastened to the plate 27 by a nut 81 that engages a lock washer at the upper face of the plate 27. The support plate 32, on the other hand, is fastened at the upper ends of the fasteners by nuts designated at 82 and which are also secured against vibrations by suitable lock nuts.

The leads 83 for circuit components 28, 29, 30 and 31 extend downwardly through plate 32 and are soldered to the printed circuit elements 33 at the bottom of the plate. These printed elements 33 electrically connect with the appropriate fasteners in forming the circuit 39 diagrammatically shown in FIG. 6.

The terminals 85 and 86 for the housed circuit components are mounted in suitable insulating sleeves 87 that extend through appropriate holes in plate 42 at the opposite sides of the inlet port 12. Within chamber 15, the terminals 85 and 86, are electrically connected to the appropriate fasteners 77, 78 and 79 by electrical leads, collectively designated at 88, with the induction coil 35 in plate 27 being appropriately inserted in one of the leads.

All of the current conducting elements in chamber 15 and 16 are coated in the embodiment illustrated with a suitable plastic mateiral, not shown, so as to electrically insulate the elements from the fluid in the chamber.

As previously indicated various means for translating the mechanical motion of the rotor into a useful electrical output signal may be employed. The circuit 39 illustrated in FIG. 6 is basically an oscillator circuit in which the terminals 85 and 86 are connected to DC power source 90. Resistor 31 furnishes forward bias and transistor 28 normally draws current. As current flow increases through inductance 34, the signal is coupled to inductance 35 and the capacitance 30, which isolates the base from the emitter, develops high negative voltage on its base side. This reduces the current flowing in the base and hence in the collector circuit. As the current flowing in the collector circuit decreases, the signal is coupled back into the base circuit tending to reverse the charge on the capacitor 30. The transistor again conducts more heavily and the cycle is repeated. The distributed capacitance of inductances 34 and 35 provides sinusoidal current variations through the transistor.

When the metal segment 36 rotates into position between inductances 34 and 35 oscillation ceases. The average current throuh the transistor 28 when oscillating is less than the average when it is not oscillating. Consequently with continual rotation of rotor 17, the segment accomplishes alternate cut-off and cut-on of oscillations, and causes the DC current to rise and fall to generate a train of voltage pulses at the terminals which are related to the angular velocity of the rotor. Capacitor 29 is for high frequency bypass and the frequency of oscillation is high enough compared to the rotation of the rotor so that response time is not critical.

The counter 91 is connected to the output in the illustration and serves to count the pulses to provide for any given time interval an integrated value indicative of the total volume fluid flow during the interval. The oscillator circuit shown is known in the art and it is deemed apparent that the signal output can be otherwise used and fed for example to continuous recording devices and flow regulating devices to mention but a few.

Reference is now made to FIG. 10 and the meter installation shown therein. Here the metering device 10 is arranged to sense the differential pressure across an orifice plate 92 inserted in a natural gas main or conduit 93. The plate 92 is bolted between the flanges 94 of adjacent pipe sections by bolts 95. The feed conduit 40 is tapped into the conduit 93 at the upstream side of the plate 92 and the discharge pipe 59 is tapped into conduit 93 at the vena contracta in the downstream side of the plate 92 as is well known in the art. Plate 92 contracts the flow of the gas in the main 93 and creates a pressure differential across the plate and which shunts a determinable portion of the flow through the meter 10 so that meter 10 functions as a proportional flow meter in a manner well known in the art.

In this system the pressure in chamber 15 is virtually the same as at the upstream tap 96 and the pressure in zone 20 is virtually the same as at the downstream tap 97, and the volume flow rate of fluid through the meter 10 is proportional to the total volume flow rate in the main.

Operationally, the gas flows in the main 93 in the direction of arrow 97 and passes through the orifice 98 in plate 92. Because of the pressure difference, a portion of the fluid enters feed pipe 40, passes through meter 10 and then returns to the main 93 through discharge conduit 59. In the meter 10, the fluid passes through the orifice 18 into zone 19 and discharges thereby through the annular opening 23 between the rim 55 and the rotor 17 and into zone 20 and from whence it passes out the meter through opening 13 to return to the gas main via pipe 59.

The body of gas established in zone 19 rotates of course about axis 25 at a velocity which increases and decreases in amount with corresponding increases and decreases in the volume flow rate of the gas delivered to the device through feed pipe 40. The rotor 17 is freely supported by the fluid in the rotor chamber and is rotatably driven through contact with fluid in zone 19. In the embodiment illustrates, the rotor rotates at practically the same velocity as the fluid body in zone 19 and is retarded in its rotary movement for practical purposes only because of friction occasioned by contact with the fluid in zone 20. The arrangement in zone 20, however, is such that upon discharging from zone 19, the fluid continues to circulate about the axis of the housing as it progresses toward port 13 so that fluid friction is not appreciable.

With each revolution of the rotor, segment 36 passes through the space between the coils 34 and 35 of the detector and hence interrupts the oscillator to provide a pulse that is recorded by the counter 91. The counter 91 may be calibrated to read out the signal in terms of the volume of gas that flows through the main with each revolution of the rotor 17 as will be apparent to those skilled in the art, to thus provide an integrated valve representing the total volume of gas flow in main over the time interval of registration.

While only certain preferred embodiments of this invention have been shown and described by way of illustration, many modifications will occur to those skilled in

What is claimed as new and what it is desired to secure by Letters Patent of the United States is:

1. A fluid flow metering device comprising surface means which defines an upwardly opening cavity having an axis and which has a rim portion that defines the cavity opening, a rotor which has an axis of rotation and which is arranged in the cavity opening and restingly supported on said rim portion with its rotation axis in alignment with the cavity axis, said rotor and said surface means being spaced apart below the rim portion to therebelow provide a zone in the cavity for receiving fluid delivered to the device, fluid inlet means opening into said cavity below said rim portion for discharging fluid delivered to the device into said zone, said rotor being free to rise with respect to the rim portion and to therewith define an annular flow constricting opening for the discharge of fluid from the zone, said fluid inlet means being arranged to cooperate with said surface means during the delivery of fluid to the device in providing a fluid body in the zone which rotatably responds to changes in the flow rate of fluid delivered to the device and which rotates with respect to the cavity axis, said rotor being rotatably drivable through contact with fluid discharged into the zone and being supportable apart from said surface means by fluid discharge into the zone when thus driven.

2. A fluid flow metering device in accord with claim 1 wherein said rotor is free to tilt with respect to the cavity axis and has means acting centrifugally when the rotor is fluid supported and driven to stabilize the rotation of the rotor with respect to the cavity axis.

3. A fluid flow metering device in accord with claim 1 wherein said rotor has sensible means carried by and rotatable therewith about the axis of the rotor and further comprising translation means for translating rotational motion of the rotor into an electrical output signal including means offset from the rotor structure for sensing rotational movement of the sensible means.

4. A fluid flow metering device in accord with claim 1 wherein said rotor is free to tilt with respect to the cavity axis and has means acting centrifugally when the rotor is fluid supported and driven to stabilize the rotation of the rotor with respect to the cavity axis, and further has sensible means carried by the rotor and rotatable therewith about its axis of rotation and wherein said device further comprises translation means for translating rotational motion of the rotor into an electrical output signal including means offset from the rotor for sensing rotational movement of the sensible means.

5. A fluid flow metering device in accord with claim 1 wherein said rotor is free to tilt with respect to the cavity axis and has a hollow portion that opens to the exterior of the rotor above the cavity opening, passageway means interconnecting said zone and said hollow portion, and means acting centrifugally when the rotor is fluid supported and driven to stabilize its rotation with respect to the cavity axis.

6. A fluid flow metering device in accord with claim 1 wherein said rotor is free to tilt with respect to the cavity axis and has a hollow portion that opens to the exterior of the rotor above the cavity opening, and means acting centrifugally when the rotor is fluid supported and driven to stabilize its rotation with respect to the cavity axis; and wherein said device further comprises translation means for translating rotational motion of the rotor into an electrical output signal including means which is offest from the rotor structure for detecting such motion and which has a component located in said hollow portion.

7. A fluid flow metering device in accord with claim 1 wherein said rotor is free to tilt with respect to the cavity axis and has an exterior surface portion that has a generally hemispherical contour and a center of curvature which is located on the rotor axis, a center of mass which is located at said center of curvature, and means acting centrifugally when the rotor is fluid supported and driven to stabilize its rotation with respect to the cavity axis.

8. A fluid flow metering device in accord with claim 1 wherein said rotor is free to tilt with respect to the cavity axis and has an exterior surface portion that has a generally hemispherical contour and a center of curvature which is located on the rotor axis; wherein said surface means has a contour below said rim portion that generally matches the contour of a portion of said exterior surface portion; and wherein said rotor has a center of mass which is located at said center of curvature and above the cavity opening, and means acting centrifugally when the rotor is fluid supported and driven to stabilize its rotation with respect to the cavity axis.

9. A fluid flow metering device in accord with claim 1 wherein said rotor is free to tilt with respect to the cavity axis and has an exterior surface portion that has a generally hemispherical contour and a center of curvature which is located on the rotor axis, a center of mass which is located at the center of curvature and above the cavity opening, a hollow portion that opens to the exterior of the rotor above the cavity opening, and means acting centrifugally when the rotor is fluid supported and driven to stabilize its rotation with respect to the cavity axis; wherein said surface means has a contour below said rim portion that generally matches the contour of a portion of said exterior surface portion; wherein said device further comprises translation means for translating rotational motion of the rotor into an electrical output signal including means offset from the rotor structure for detecting such motion; and wherein said rotor has passageway means interconnecting said zone and said hollow portion.

10. A fluid flow metering device comprising a chamber having surface means defining an upwardly opening cavity in the interior of the chamber, and means permitting the passage of fluid delivered to the device through said chamber including fluid inlet means opening into the cavity through said surface means for discharging fluid delivered to the device into said chamber, and fluid outlet means remote from said surface means, and a rotor arranged in the cavity opening; said surface means being adapted and arranged to cooperate with said inlet means during the passage of fluid through the chamber in providing a fluid body in the cavity which is rotatably responsive to changes in the flow rate of fluid delivered to the device and which rotates about an axis established by said surface means, said rotor having an axis of rotation and being free to tilt with respect to the axis established by said surface means, said rotor being rotatably drivable with respect to the axis established by said surface means through contact with the body fluid in said cavity, said rotor being free when thus driven to orient itself horizontally in the cavity opening in response to fluid movement in the chamber and being wholly supportable spacedly apart from said surface means by fluid in the chamber when thus driven, said rotor having means acting centrifugally when the rotor is fluid supported and driven to stabilize its rotation with respect to the established axis.

11. A fluid flow metering device in accord with claim 10 wherein said surface means has a rim portion defining the cavity opening, wherein said rotor has an exterior surface portion that extends into the cavity through said cavity opening and which defines with said rim portion an annular opening thereat through which fluid discharges from the cavity when the rotor is being driven, said rim portion being adapted and arranged to provide an annular lip which overhangs the cavity space at the cavity opening to thereby provide a constriction in the path of fluid movement through said annular opening for stabilizing said rotor against lateral movement with respect to the established axis.

12. A fluid flow metering device in accord with claim 10 wherein said rotor has sensible means carried by and rotatable therewith about the rotor axis and further comprising translation means for translating rotational motion of the rotor into an electrical output signal including means offset from the rotor structure for sensing rotational movement of the sensing means.

13. A fluid flow metering device in accord with claim 10 wherein said rotor has a hollow portion that opens to the exterior of the rotor above the cavity opening, and passageway means communicating with the fluid body and the hollow portion; wherein said surface means has a rim portion defining the cavity opening; wherein said rotor has an exterior surface portion which is symmetrically arranged with respect to the rotor axis, extends into the cavity through said cavity opening, and defines with said rim portion an annular opening thereat through which fluid discharges from the cavity when the rotor is being driven; wherein said rim portion is adapted and arranged to provide an annular lip which overhangs the cavity space at the cavity opening to thereby provide a constriction in the path of fluid movement through said annular opening for stabilizing said rotor against lateral movement with respect to the established axis; and wherein said device further comprises translation means for translating rotational motion of the rotor into an electrical output signal including means offset from the rotor structure for detecting such motion.

14. A fluid flow metering device comprising surface means defining an open cavity having an axis, fluid inlet means opening through the surface means and arranged to cooperate therewith in providing a fluid body in the cavity which rotatably responds to the flow rate of fluid delivered to the device and rotates about said axis, a rotor which is rotatably drivable through contact with the fluid delivered to the cavity through said inlet means and which is supportable in the cavity opening by fluid delivered to the device, said rotor having an axis of rotation and being free to tilt with respect to the cavity axis and to orient itself horizontally in the cavity opening in response to fluid movement in the cavity when thus driven, said rotor and said surface means being adapted and arranged to provide a flow constricting annular fluid discharge opening at the cavity opening when the rotor is thus driven to thereby stabilize the rotor at the center of the cavity opening, and said rotor having means acting centrifugally when the rotor is fluid supported and driven to stabilize its rotation with respect to the cavity axis.

15. A fluid flow metering device in accord with claim 14 wherein the surface means has an annular lip portion defining the cavity opening, and wherein the means acting centrifugally includes an annular rotor portion which is symmetrically arranged with respect to the rotor axis.

References Cited

UNITED STATES PATENTS

| 2,052,794 | 9/1936  | Petot          | 73—230  |
| 2,847,969 | 8/1958  | Woodruff       | 116—117 |
| 3,216,252 | 11/1965 | Chapman et al. | 73—229  |

FOREIGN PATENTS 637,474    2/1962   Canada.

RICHARD C. QUEISSER, Primary Examiner

J. K. LUNSFORD, Assistant Examiner